United States Patent
Taki

(10) Patent No.: US 9,304,544 B2
(45) Date of Patent: Apr. 5, 2016

(54) SYSTEM AND DISPLAY CONTROL METHOD FOR EXTERNAL DEVICE

(71) Applicant: KABUSHIKI KAISHA TOSHIBA, Minato-ku, Tokyo (JP)

(72) Inventor: Kinji Taki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 376 days.

(21) Appl. No.: 13/925,499

(22) Filed: Jun. 24, 2013

(65) Prior Publication Data

US 2014/0379951 A1   Dec. 25, 2014

(51) Int. Cl.
  *G06F 1/16*   (2006.01)
  *G06F 13/40*   (2006.01)

(52) U.S. Cl.
  CPC .......... *G06F 1/1632* (2013.01); *G06F 13/4068* (2013.01)

(58) Field of Classification Search
  CPC .......................... G06F 1/1632; G06F 13/4068
  USPC ....................................................... 710/303
  See application file for complete search history.

(56) References Cited

U.S. PATENT DOCUMENTS

| | | | | |
|---|---|---|---|---|
| 6,964,054 B1* | 11/2005 | Laviolette | ............ | G06F 9/4401 711/165 |
| 2010/0295384 A1* | 11/2010 | Kobayashi | ............ | G06F 13/385 307/154 |
| 2012/0151403 A1* | 6/2012 | Bhogal | ................. | G06F 3/1431 715/778 |
| 2012/0287343 A1* | 11/2012 | Kelly | .................... | G06F 3/1438 348/554 |
| 2012/0331200 A1* | 12/2012 | Smith | ................... | G06F 1/1632 710/303 |

FOREIGN PATENT DOCUMENTS

| | | |
|---|---|---|
| JP | 11-143598 A | 5/1999 |
| JP | 2000-039983 A | 2/2000 |
| JP | 2004-334093 A | 11/2004 |

* cited by examiner

*Primary Examiner* — Glenn A Auve
(74) *Attorney, Agent, or Firm* — Knobbe, Martens, Olson & Bear LLP

(57) ABSTRACT

According to one embodiment, an external device includes a switching module configured to switch an external display, which is to be connected to a port of a display control circuit in an information processing device, between first and second external displays connected to the external device. A controller detects a state of a first detection signal representing whether or not a first external display is connected to the external device and a state of a second detection signal representing whether or not a second external display is connected to the external device. The controller controls the switching module based on the detected states of the first and second detection signals and a display priority.

8 Claims, 9 Drawing Sheets

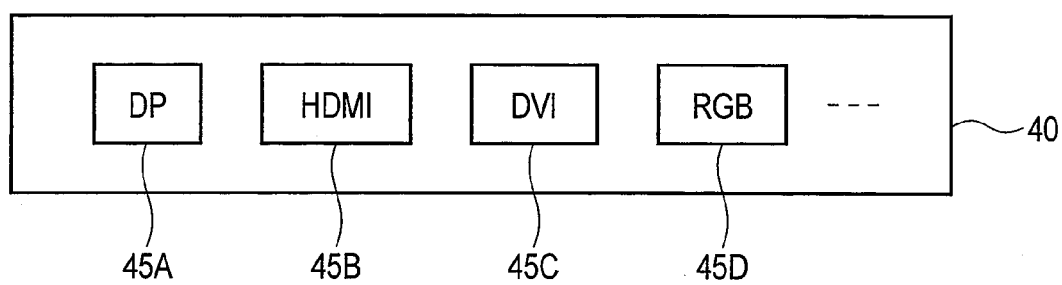
F I G. 3

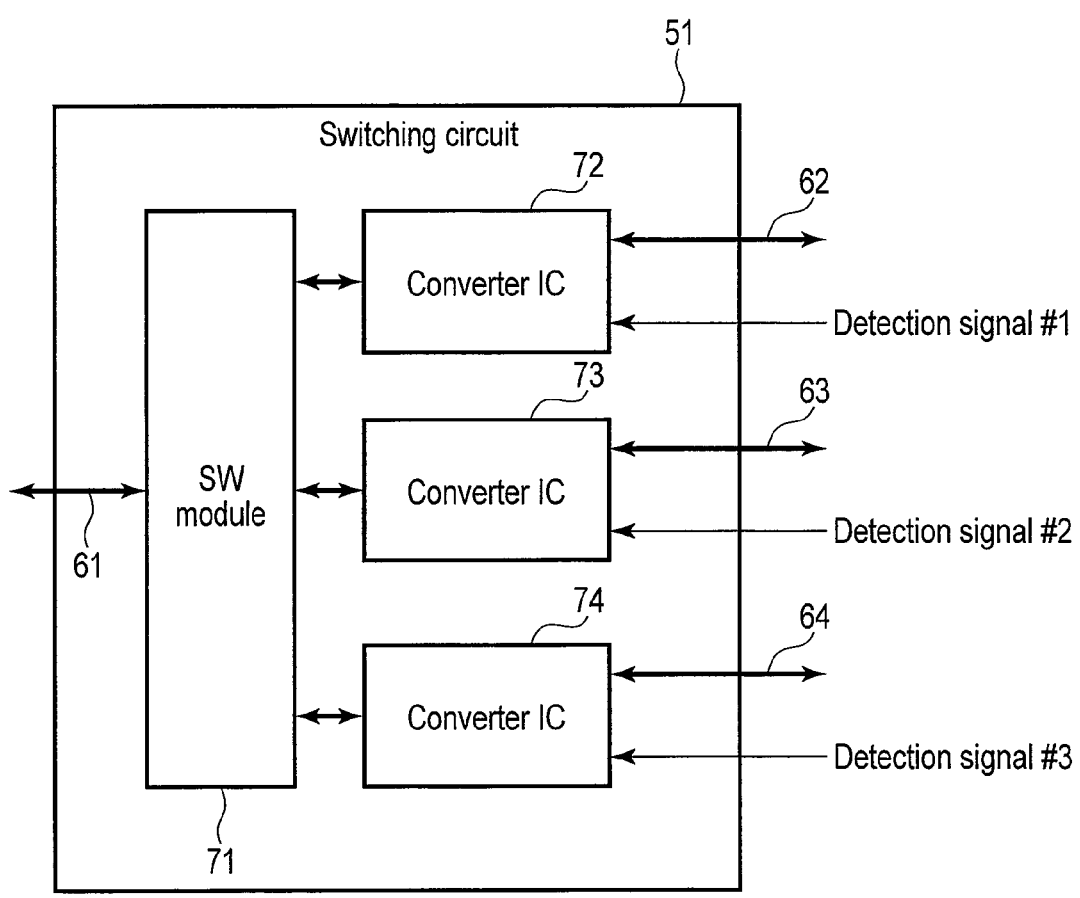
F I G. 6

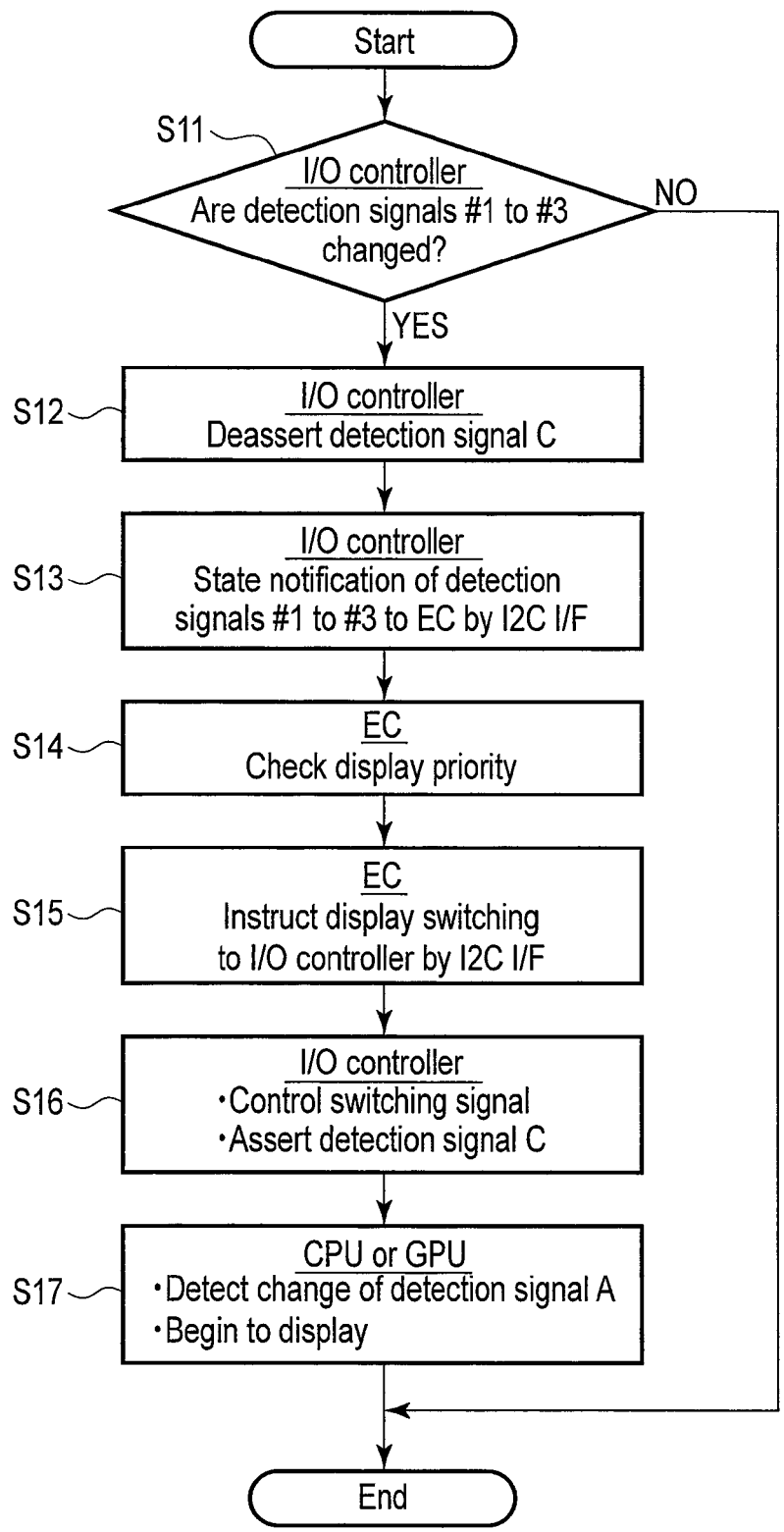
F I G. 7

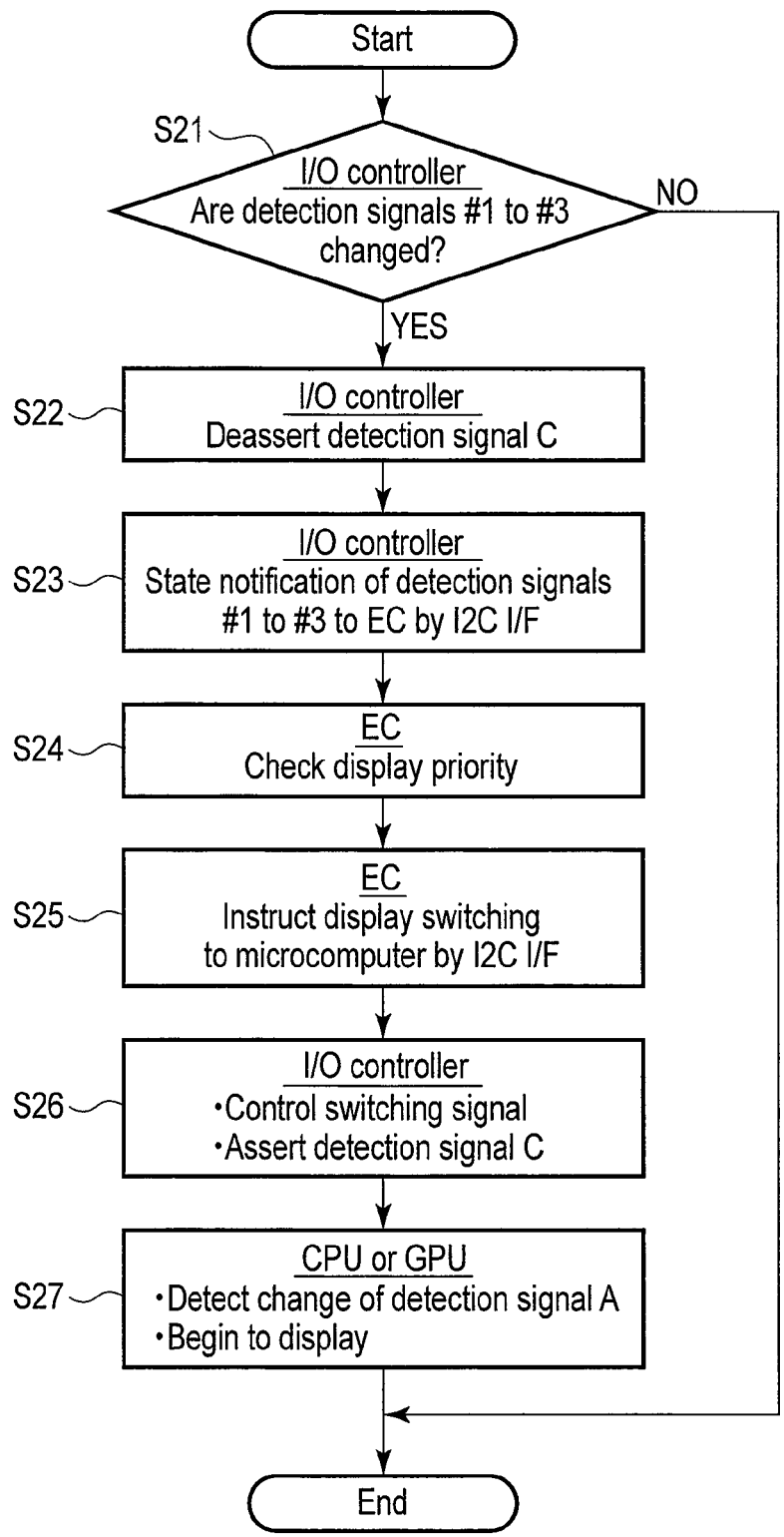
F I G. 8

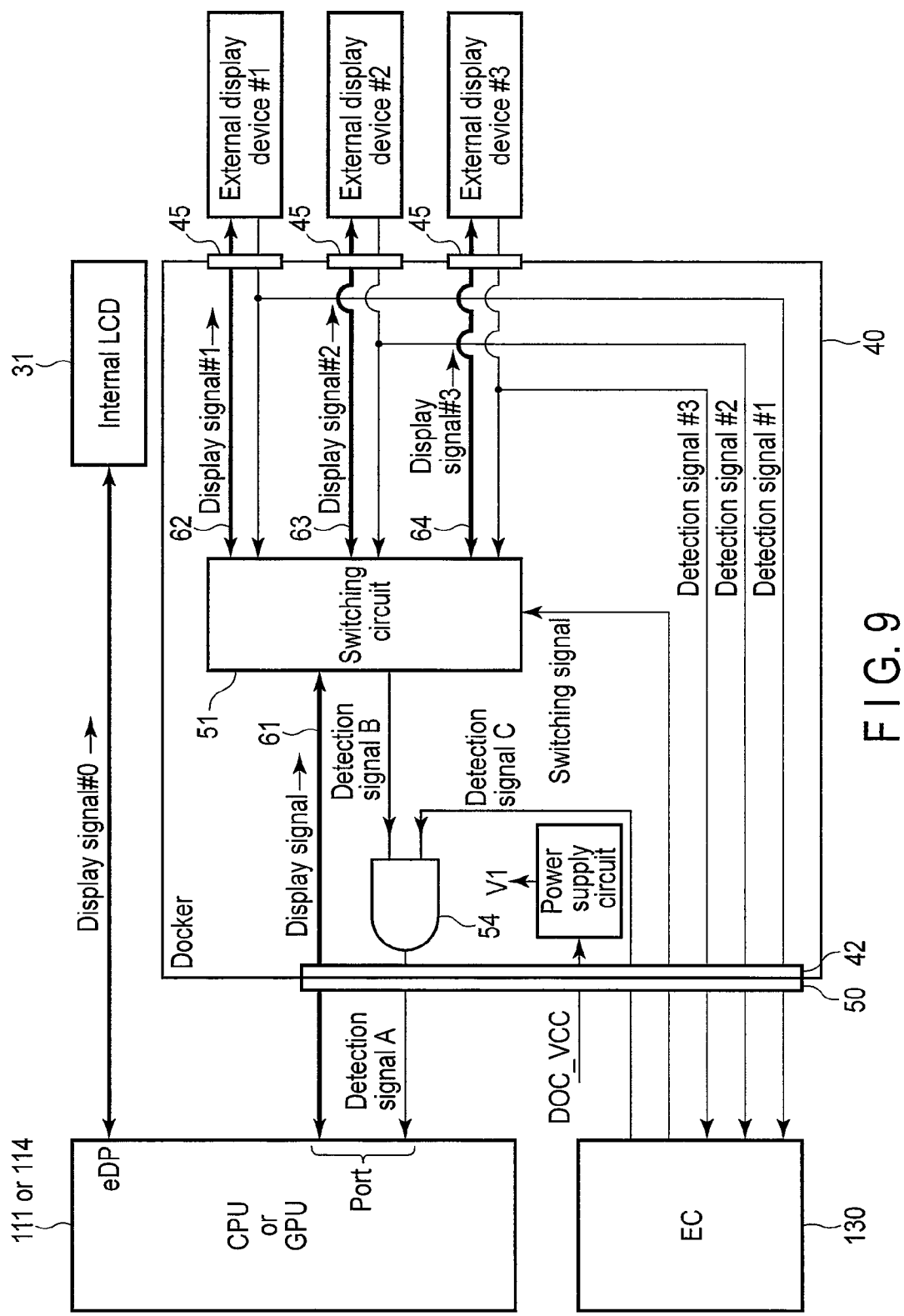
F I G. 9

SYSTEM AND DISPLAY CONTROL METHOD FOR EXTERNAL DEVICE

FIELD

Embodiments described in this specification relate generally to a technique of controlling an external display.

BACKGROUND

Recently, various notebook type or laptop type portable personal computers have been developed. Of these computers, there is a computer that can use an external device, called "docking station", "docker", or "port replicator".

An external device includes a display connection terminal configured to connect an external display. In a state in which the computer is attached to the external device, a port of a display control circuit within the computer is connected to the display connection terminal through the external device. Therefore, the computer may use the external display, which is connected to the display connection terminal of the external device, as a display monitor of the computer.

Incidentally, in recent years, as a type of an external display increases, mounting a plurality of display connection terminals on an external device is beginning to be required.

However, if using a configuration in which the plurality of display connection terminals of the external device is connected to the ports of the display control circuit within the computer one to one, it is necessary to increase the number of the ports included in the display control circuit within the computer. The increase in the number of the ports included in the display control circuit may be factor causing a cost increase of the computer.

Also, in many portable personal computers, a display control circuit is embedded into a central processing unit. Therefore, increasing the number of ports included in the display control circuit is not practical.

Therefore, there is a need for implementing new technique which can mount a plurality of display connection terminals on an external device without increasing the number of ports included in the display control circuit.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a diagram describing an example of a type of a display connection terminal provided on a rear surface of the external device in the system according to the embodiment;

FIG. 6 is an exemplary block diagram illustrating a configuration of a switching circuit within the external device of FIG. 5;

FIG. 7 is an exemplary flowchart illustrating a procedure of a display control process that is executed upon docking in the system according to the embodiment;

FIG. 8 is an exemplary flowchart illustrating a procedure of a display control process that is executed upon removal of an external display in the system according to the embodiment; and FIG. 9 is an exemplary block diagram illustrating another configuration of the external device within the system according to the embodiment.

DETAILED DESCRIPTION

Various embodiments will be described below with reference to the accompanying drawings.

In general, according to an embodiment, a system includes an external device, and an information processing device that is removably attached to the external device. The system includes first and second display connection terminals in the external device, a docking connector in the external device and electrically connected to a port of a display control circuit in the information processing device, a switching module in the external device, and a controller. The switching module switches an external display, which is to be connected to the port of the display control circuit, between a first external display connected to the first display connection terminal and a second external device connected to the second display connection terminal. The controller detects a state of a first detection signal representing whether or not the first external display is connected to the first display connection terminal and a state of a second detection signal representing whether or not the second external display is connected to the second display connection terminal, and controls the switching module based on the detected states of the first and second detection signals and a preset display priority.

First, a configuration of a system according to an embodiment will be described below with reference to FIG. 1. The system includes an external device, and an information processing device that is removably attached to the external device. The information processing device may be implemented as, for example, a notebook type portable personal computer or various information processing devices. Hereinafter, a case where the information processing device is implemented as a notebook type portable personal computer 10 will be assumed. The external device is an electronic device that allows the computer 10 to easily use various peripheral devices, and functions as a device called "docking station", "docker" or "port replicator". Hereinafter, a case where the external device is implemented as an electronic device (docker) 40 with a plurality of display connection terminals will be assumed.

Figure 1:
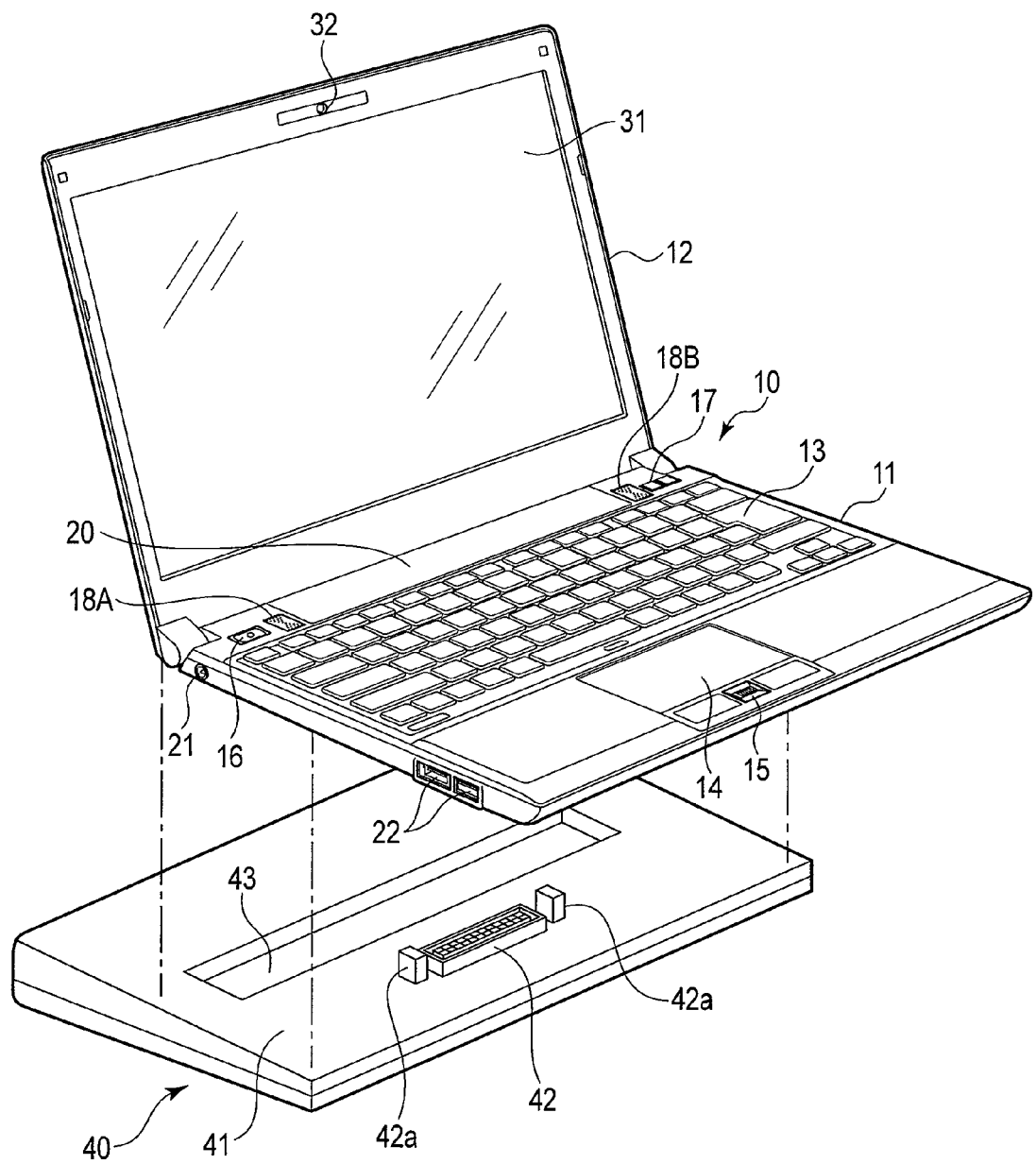
FIG. 1 is an exemplary perspective view illustrating external appearances of an information processing device and an external device used in a system according to an embodiment.

FIG. 1 is a perspective view viewed from the front side of the computer 10 in a state in which a display unit is opened. The computer 10 is configured to receive power from a battery 20. The computer 10 includes a computer main body 11 and a display unit 12. A display device such as a liquid crystal display (LCD) 31 is embedded in the display unit 12. Also, a camera (web camera) 32 is disposed in an upper portion of the display unit 12.

The display unit 12 is attached to the computer main body 11 rotatably between an open position to which a top surface of the computer main body 11 is exposed and a closed position at which the top surface of the computer main body 11 is covered with the display unit 12. The computer main body 11 includes a housing including a slim box shape, and a keyboard 13, a touch pad 14, a fingerprint sensor 15, a power switch 16 for powering on/off the computer 10, some of function buttons 17, and speakers 18A and 18B are disposed on the top surface thereof.

Also, a power connector 21 is provided in the computer main body 11. The power connector 21 is provided on a side of the computer main body 11, for example, a left side. An external power supply is removably connected to the power connector 21. As the external power supply, an AC adapter may be used. The AC adapter is a power supply that converts commercial power (AC power) into DC power.

The battery 20 is removably attached to, for example, a rear portion of the computer main body 11. The battery 20 may be a battery embedded in the computer 10. Instead of the battery 20, a large-capacity battery including a larger capacity than the battery 20 may be attached to the rear portion of the computer main body 11.

The computer 10 is driven by power from the external power supply or power from the battery 20. If the external power supply is connected to the power connector 21 of the computer 10, the computer 10 is driven by the power from the external power supply. Also, the power from the external power supply may be used to charge the battery 20. During a period of time when the external power supply is not connected to the power connector 21 of the computer 10, the computer 10 is driven by the power from the battery 20.

Also, some of USB ports 22 is provided in the computer main body 11.

The computer 10 is configured to be removably attached to the docker (external device) 40. The docker 40 includes a plurality of connectors for connecting various peripheral devices, and functions as an expansion unit for expanding the function of the computer 10. The docker 40 includes a mounting surface 41 on which a rear portion of the computer main body 11 is mounted. A docking connector 42 is provided on the mounting surface 41. When the computer 10 is attached to the docker 40, the connector provided on the bottom surface of the computer main body 11 and the docking connector 42 provided on the mounting surface 41 are physically and electrically connected to each other. Two protrusions 42a are disposed on both sides of the docking connector 42. When the computer 10 is attached to the docker 40, the two protrusions 42a are inserted into two holes disposed on the bottom surface of the computer main body 11. A groove 43 is provided on the mounting surface 41. When the large-capacity battery is attached to the computer main body 11, a part of the large-capacity battery is received in the groove 43. Therefore, the computer main body 11 may be attached to the docker 40 while the large-capacity battery remains mounted.

Figure 2:
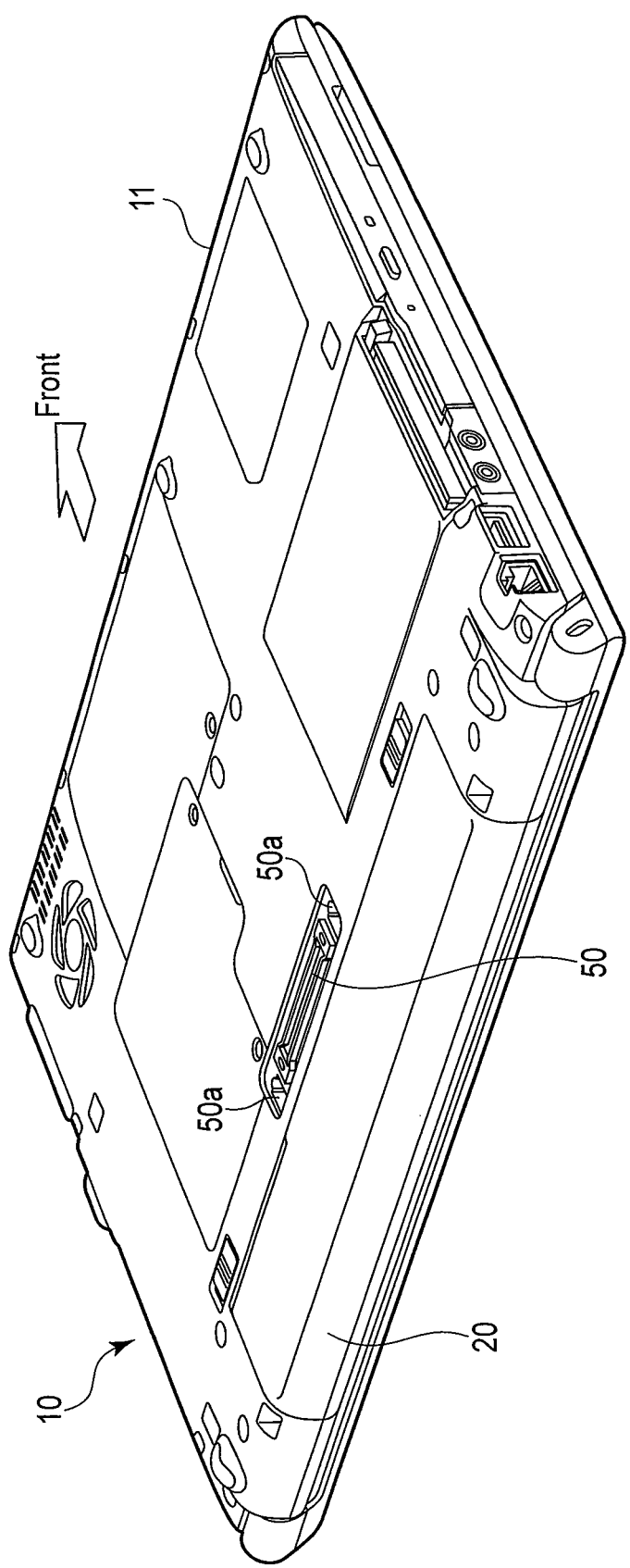
FIG. 2 is an exemplary perspective view illustrating a docking connector provided on a bottom surface of the information processing device within the system according to the embodiment.

FIG. 2 illustrates the bottom surface of the computer 10. As illustrated in FIG. 2, a connector 50, which may be connected to the docking connector 42 of the docker 40, is provided on the bottom surface of the computer 10. As described above, the two holes 50a, into which the two protrusions 42a may be inserted, are provided on both sides of the connector 50.

FIG. 3 illustrates a plurality of display connection terminals provided on the rear surface of the docker 40. FIG. 3 illustrates an example in which a display connection terminal 45A corresponding to displayport (DP) standard, a display connection terminal 45B corresponding to high-definition multimedia interface (HDMI) standard, a display connection terminal 45C corresponding to Digital Visual Interface (DVI) standard, and a display connection terminal 45D corresponding to analog RGB are disposed on the rear surface of the docker 40.

Figure 4:
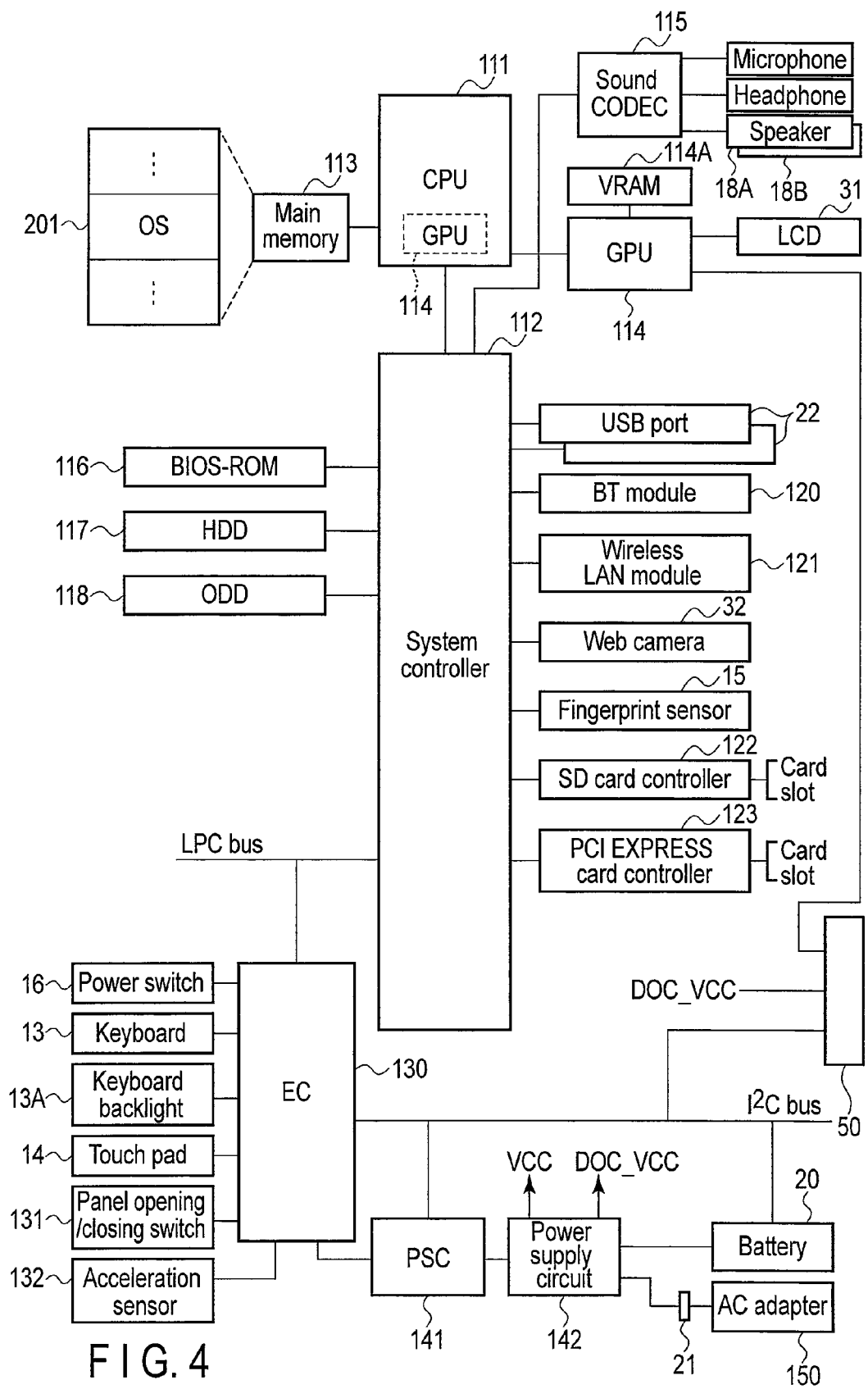
FIG. 4 is an exemplary block diagram illustrating a configuration of the information processing device within the system according to the embodiment.

FIG. 4 illustrates a configuration of the computer 10. The computer 10 includes a central processing unit (CPU) 111, a system controller 112, a main memory 113, a graphics processing unit (GPU) 114, a sound codec 115, a BIOS-ROM 116, a hard disk drive (HDD) 117, an optical disk drive (ODD) 118, a BT (Bluetooth™) module 120, a wireless LAN module 121, an SD card controller 122, a PCI EXPRESS card controller 123, an embedded controller (EC) 130, and a keyboard backlight 13A, a panel opening/closing switch 131, an acceleration sensor 132, a power supply controller (PSC) 141, and a power supply circuit 142.

The CPU 111 is a processor that controls an operation of each component of the computer 10. The CPU 111 executes various software items that are loaded from the HDD 117 on the main memory 113. The software items include an operating system (OS) 201 and various application programs.

The CPU 111 also executes the basic input/output system (BIOS) stored in the BIOS-ROM 116 being a nonvolatile memory. The BIOS is a system program for hardware control.

The GPU 114 is a display control circuit configured to control the LCD (internal LCD) 31 used as an internal display monitor of the computer 10. The GPU 114 generates a display signal (LVDS signal) to be provided to the LCD 31 from display data stored in a video memory (VRAM) 114A. Also, the GPU 114 includes one or more ports, for example, two DPs, each of which can output the display signal (digital signal). The one or more ports of the GPU 114 may be used to provide the display signal to an external display connected to the docker 40. As illustrated in FIG. 1, the one or more ports of the GPU 114 are connected to the connector 50. Also, the GPU 114 may be an internal GPU embedded in the CPU 111.

The system controller 112 is a bridge device that connects the CPU 111 and each component. The system controller 112 is embedded with a serial ATA controller for controlling the hard disk drive (HDD) 117 and the optical disk drive (ODD) 118. Also, the system controller 112 performs communication with each device on a low pin count (LPC) bus.

The EC 130 is connected to the LPC bus. The EC 130, the power supply controller (PSC) 141, and the battery 20 are mutually connected through a serial bus such as an $I^2C$ bus.

The EC 130 is a power management controller for performing power management of the computer 10. For example, the EC 130 is implemented as a one-chip microcomputer embedded with a keyboard controller that controls the keyboard (KB) 13 and the touch pad 14, or the like. The EC 130 has a function of powering on and off the computer 10 according to a user's manipulation of the power switch 16. The power on/off control of the computer 10 is performed by a co-operation of the EC 130 and the power supply controller (PSC) 141. When an ON signal transmitted from the EC 130 is received, the power supply controller (PSC) 141 powers on the computer 10 by controlling the power supply circuit 142. When an OFF signal transmitted from the EC 130 is received, the power supply controller (PSC) 141 powers off the computer 10 by controlling the power supply circuit 142. The EC 130, the power supply controller (PSC) 141, and the power supply circuit 142 are operated by the power from the battery 20 or the AC adapter 150 even during a period of time when the computer 10 is powered off.

Also, the EC 130 may turn on/off the keyboard backlight 13A disposed on the rear surface of the keyboard 13. Also, the EC 130 is connected to the panel opening/closing switch 131 configured to detect the opening/closing of the display unit 12. Even when the opening of the display unit 12 is detected by the panel opening/closing switch 131, the EC 130 can power on the computer 10.

The power supply circuit 142 generates power (operating power) VCC to be supplied to each component by using the power from the battery 20 or the power from the AC adapter 150 connected to the computer main body 11 as an external power supply. Also, the power supply circuit 142 can generate power (operating power) DOC-VCC to be supplied to an internal circuit of the docker 40. The DOC-VCC is supplied to the inner circuit of the docker 40 through the connector 50.

Figure 5:
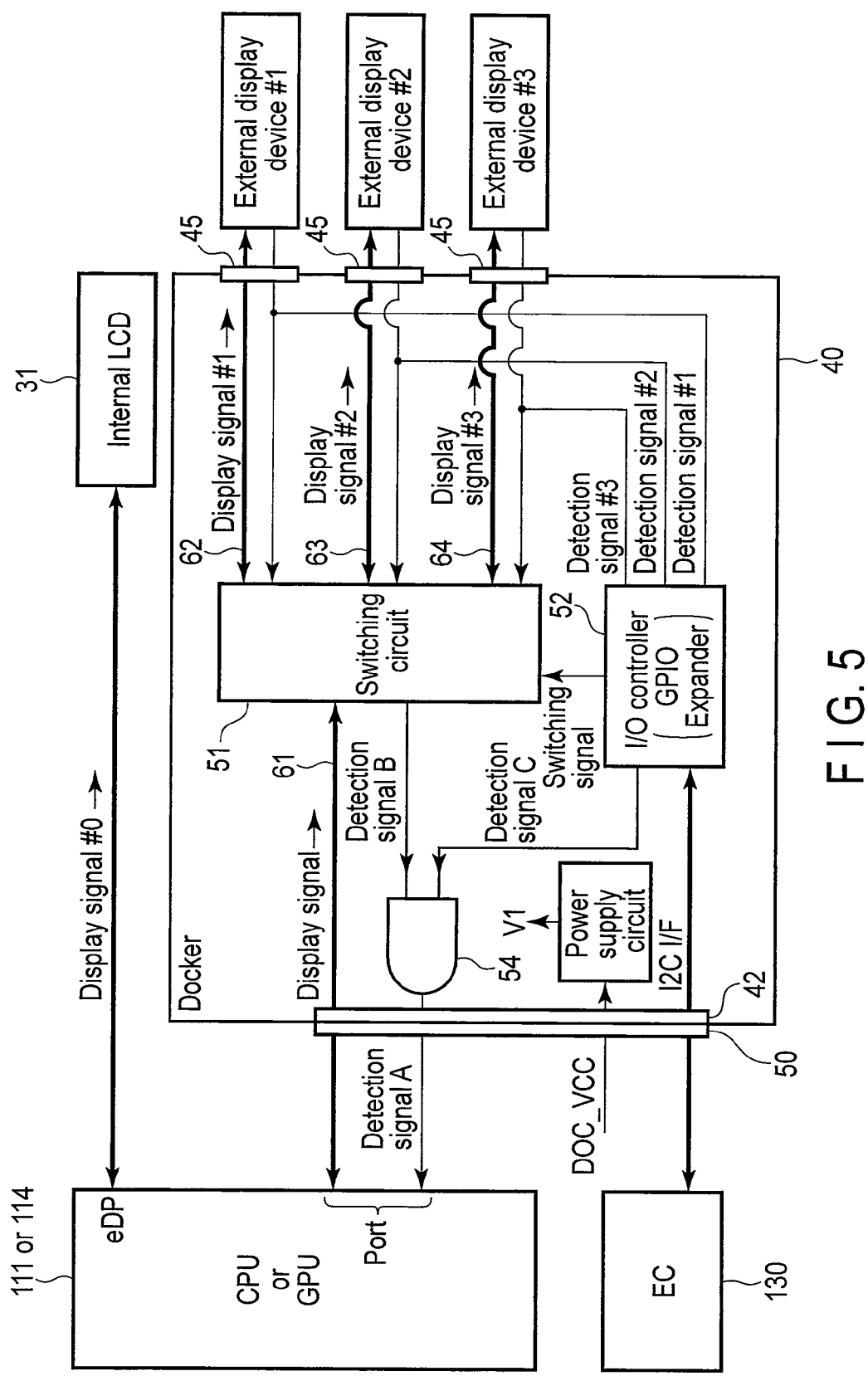
FIG. 5 is an exemplary block diagram illustrating a configuration of the external device within the system according to the embodiment.

FIG. 5 illustrates a configuration of the docker 40.

The docker 40 includes a plurality of display connection terminals 45 and the above-described docking connector 42. A case where the docker 40 includes different types of three display connection terminals 45 will be assumed herein. A first external display #1 corresponding to the standard of the first display connection terminal 45 may be connected to the first display connection terminal 45. A second external display #2 corresponding to the standard of the second display connection terminal 45 may be connected to the second display connection terminal 45. A third external display #3 corresponding to the standard of the third display connection terminal 45 may be connected to the third display connection terminal 45.

The display control circuit (CPU 111 or GPU 114) within the computer 10 includes a port for transmitting the display signal to the internal LCD 31. The port may be, for example, an embedded display port (eDP) interface.

Also, the display control circuit (CPU 111 or GPU 114) includes a port for transmitting the display signal to the external display. The port for the external display may be, for example, an interface corresponding to the DP standard. The docking connector 42 of the docker 40 is electrically connected to the port for the external display of the display control circuit (CPU 111 or GPU 114).

The docker 40 includes a switching circuit 51, an I/O controller (GPIO expander) 52, a power supply circuit 53, and an AND gate circuit 54 as an inner circuit thereof.

The switching circuit 51 is configured to switch the display connected to the port for the external display of the display control circuit (CPU 111 or GPU 114) among the first to third external displays #1 to #3. In other words, the switching circuit 51 selects one of the three display connection terminals 45, and connects the selected display connection terminal and the port for the external display of the CPU 111 or the GPU 114. The switching circuit 51 is connected to the port for the external display through a bus (display signal I/F) 61. Also, the switching circuit 51 is connected to the first display connection terminal 45 through a bus (display signal I/F) 62, is connected to the second display connection terminal 45 through a bus (display signal I/F) 63, and is connected to the third display connection terminal 45 through a bus (display signal I/F) 64.

Also, the switching circuit 51 may read information (EDID) representing a resolution of and a refresh rate of each external display from each external display, and also convert the display signal received from the port for the external display into a display signal suitable for each external display.

Moreover, the switching circuit 51 may detect a state of a detection signal #1 representing whether or not the first external display #1 is connected to the first display connection terminal 45, a state of a detection signal #2 representing whether or not the second external display #2 is connected to the second display connection terminal 45, and a state of a detection signal #3 representing whether or not the third external display #3 is connected to the third display connection terminal 45. Regarding each of the detection signals, "1" represents that the external display is connected, and "0" represents that the external display is not connected. As these detection signals, a hot plug detect (HPD) signal included as a part of each bus (display I/F) 62, 63 and 64 may be used. The hot plug detect (HPD) signal regarding the first external display #1 is received from the first external display #1 through the first display connection terminal 45. Likewise, the hot plug detect (HPD) signal regarding the second external display #2 is received from the second external display #2 through the second display connection terminal 45, and the hot plug detect (HPD) signal regarding the third external display #3 is received from the third external display #3 through the third display connection terminal 45.

The switching circuit 51 may include a first internal circuit corresponding to the first external display #1, a second internal circuit corresponding to the second external display #2, a third internal circuit corresponding to the third external display #3, and a selection circuit that selects one of these internal circuits. Each of the internal circuits may function as a converter configured to convert the display signal output from the port for the external display into a display signal including a format corresponding to the relevant external display. Each of the internal circuits initializes itself. When the initialization is completed, each of the internal circuits transmits the state of the detection signal (HPD) of the corresponding external display to the selection circuit. When the detection signal (HPD) of "1" is received from any one of these internal circuits, the selection circuit outputs a detection signal B (HPD) of "1".

By selectively using the first, second and third internal circuits, the switching circuit 51 may connect the port for the external display of the CPU 111 or the GPU 114 to the arbitrary external display.

The I/O controller 52 may detect the state ("1" or "0") of each of the above-described detection signals #1, #2 and #3. The I/O controller 52 transmits the detected states of the detection signals #1, #2 and #3 to the EC 130 through the I2C bus I/F. The EC 130 determines the external display to be used, based on the states of the detection signals #1, #2 and #3 and the preset display priority, and transmits a switching instruction representing the determined external display to the I/O controller 52 through the I2C bus I/F. The display priority is information representing the priority among a plurality of displays including the internal LCD 31 and several external displays connectable to the docker 40. The information representing the display priority may be previously loaded on the EC 130 by the BIOS.

The I/O controller 52 controls the switching circuit 51 based on the switching instruction received from the EC 130. That is, the I/O controller 52 outputs a switching signal to the switching circuit 51 to control the switching circuit 51 such that the external display designated by the switching instruction is connected to the port for the external display.

Also, the display priority may be previously determined by the OS 201, or may be freely changed by a user's manipulation. Also, the information representing the display priority may be previously downloaded from the EC 130 to the I/O controller 52. In this case, the I/O controller 52 may control the switching circuit 51 based on the detected states of the detection signals #1, #2 and #3 and the display priority.

As described above, in the present embodiment, since the docker 40 includes the switching circuit 51 and the I/O controller 52 configured to detect the detection signals #1, #2 and #3 and control the switching circuit 51, the screen may be selectively displayed on the plurality of external displays connected to the docker 40 through one port of the display control circuit. Also, since the I/O controller 52 detects the states of the detection signals branched from the buses 62, 63 and 64 between the switching circuit 51 and the three display connection terminals 45, the I/O controller 52 may immediately detect whether or not each external display is connected, without waiting for the initialization completion of each internal circuit within the switching circuit 51.

Next, an operation of switching the display to be used from the internal LCD 31 to the external display will be described.

A case where the first external display #1, the second external display #2, and the third external display #3 are connected to the docker 40 will be assumed herein. Also, the display priority is as follows.

first external display #1>second external display #2>internal LCD>third external display #3

When the computer 10 of the power on state is attached to the docker 40 (hot docking), or when the computer 10 attached to the docker 40 is powered on, the following operations are performed.

The power supply circuit 53 of the docker 40 receives the DOC-VCC and supplies the operating power to each module within the docker 40. By deasserting the detection signal C, that is, by making the detection signal C inactive, the I/O controller 52 deasserts the detection signal A, that is, makes the detection signal A inactive. The detection signal A is a signal (HPD) for notifying to the display control circuit (CPU 111 or GPU 114) that the display connected to the port for the external display of the display control circuit (CPU 111 or GPU 114) is available. The detection signal A is an output signal of the AND gate circuit 54 that receives the detection B and the detection signal C.

The I/O controller 52 detects the states of the detection signals #1, #2 and #3, and transmits the detected states of the detection signals #1, #2 and #3 to the EC 130. The EC 130 determines whether or not the external display including the highest priority is connected to the docker 40. If the external display including the highest priority is not connected to the docker 40, the EC 130 determines whether or not the external display including the second highest priority is connected to the docker 40.

That is, first, the EC 130 determines whether or not the first external display #1 including the highest priority is connected to the first display connection terminal 45, based on the detected states of the detection signals #1, #2 and #3. If the first external display #1 is connected to the first display connection terminal 45, the EC 130 (or I/O controller 52) determines the first external display #1 as the display to be displayed. In this case, the EC 130 transmits the switching instruction representing the switching to the first external display #1 to the I/O controller 52.

The I/O controller 52 controls the switching circuit 51 such that the first external display #1 is connected to the port for the external display of the display control circuit (CPU 111 or GPU 114). After the first external display #1 is connected to the port for the external display of the display control circuit (CPU 111 or GPU 114), that is, after a path for connecting the bus 61 and the bus 62 is established by the switching circuit 51, the I/O controller 52 asserts the detection signal C, that is, makes the detection signal C active, and accordingly makes the detection signal A active.

In this case, the I/O controller 52 waits until the first external display #1 is connected to the port for the external display of the display control circuit (CPU 111 or GPU 114). After the first external display #1 is connected to the port for the external display, the I/O controller 52 asserts the detection signal C. For example, the I/O controller 52 may wait until the initialization of the internal circuit (converter) of the switching circuit 51 corresponding to the first external display #1 is completed. Time necessary for the initialization of each internal circuit is previously determined. Therefore, the I/O controller 52 waits until predetermined time necessary for the initialization of the internal circuit for the first external display #1 has elapsed from the hot docking (power on of the docker 40). After the predetermined time necessary for the initialization of the internal circuit for the first external display #1 has elapsed, that is, after the first external display #1 is connected to the port for the external display, the I/O controller 52 makes the detection signal C active and accordingly makes the detection signal A active.

According to that the detection signal A is made active, the display control circuit (CPU 111 or GPU 114) may recognize that the display connected to the port for the external display is available. In this case, since the initialization of the internal circuit for the first external display #1 has already been completed, the display control circuit (CPU 111 or GPU 114) may recognize that the first external display #1 including the higher priority than the internal LCD 31 is available, by referring to the output of the internal circuit for the first external display #1. Also, the display control circuit (CPU 111 or GPU 114) may read the EDID of the first external display #1, which is currently selected by the switching circuit 51, from the switching circuit 51 or the first external display #1.

When recognizing that the first external display #1 including the higher priority than the internal LCD 31 is available, the display control circuit (CPU 111 or GPU 114) outputs the display signal to the docker 40 through the port for the external display, instead of outputting the display signal #0 to the internal LCD 31. Since the initialization of the internal circuit for the first external display #1 has already been completed, the switching circuit 51 may normally output the display signal received from the port for the external display to the first external display #1 through the internal circuit for the first external display #1. In the internal circuit for the first external display #1, the display signal received from the port for the external display may be converted into the display signal #1 including a format corresponding to the first external display #1. The display signal #1 is provided to the first external display #1.

As described above, in the present embodiment, the detection signal A is made active after the time necessary for the initialization of the internal circuit for the first external display #1 has elapsed, that is, after the first external display #1 is connected to the port for the external display.

If the detection signal B has not been masked by the detection signal C, the detection signal A becomes active, for example, in a stage where the initialization of the internal circuit corresponding to the second external display #2 has been completed. In this case, the initialization of the internal circuit corresponding to the first external display #1 may not have been completed. Therefore, it is likely that the screen will not be correctly displayed on the first external display #1. If the internal circuit for the first external display #1 and the internal circuit for the second external display #2 are connected to two ports of the display control circuit, respectively, the first external display #1 may be recognized by the display control circuit after the second external display #2 is recognized by the display control circuit. In this case, a phenomenon that the screen will be displayed on the first external display #1 after the screen is displayed once on the second external display #2 may appear.

In the present embodiment, as described above, since the detection signal A is made active after the first external display #1 is connected to the port for the external display, the screen may be correctly displayed on the first external display #1. Also, it is possible to prevent the phenomenon that the screen is displayed on the first external display #1 after the screen is displayed once on the second external display #2.

Next, an operation performed when the first external display #1 being currently used for screen display is detached from the first display connection terminal 45 will be described below.

When the I/O controller 52 detects a change (from "1" to "0") in the state of the detection signal #1, the I/O controller 52 makes the detection signal C inactive and accordingly makes the detection signal A inactive. The I/O controller 52 transmits the detected states of the detection signals #1, #2 and #3 to the EC 130. The EC 130 determines whether or not the second external display #2 including the highest priority next to the first external display #1 is connected to the docker 40, that is, determines whether or not the second external display #2 connected to the docker 40 is the external display including the higher priority than the LCD 31. Since the priority of the second external display #2 connected to the docker 40 is higher than the priority of the internal LCD 31, the EC 130 transmits the switching instruction designating the second external display #2 to the I/O controller 52. The I/O controller 52 controls the switching circuit 51 such that the second external display #2 is connected to the port for the external display of the display control circuit (CPU 111 or GPU 114). After the second external display #2 is connected to the port for the external display of the display control circuit (CPU 111 or GPU 114), the I/O controller 52 asserts the detection signal C, that is, makes the detection signal C active, and accordingly makes the detection signal A active. Herein, since the initialization of the internal circuit corresponding to the second external display #2 has already been completed, the I/O controller 52 may assert the detection signal C immediately after controlling the switching circuit 51.

Since the detection signal A becomes active again after being made inactive once, the display control circuit (CPU 111 or GPU 114) may recognize that the display connected to the port for the external display is changed. In this case, since the initialization of the internal circuit for the second external display #2 has already been completed, the display control circuit (CPU 111 or GPU 114) may recognize that the second external display #2 including the higher priority than the internal LCD 31 is available, by referring to the output of the internal circuit for the second external display #2. The display control circuit (CPU 111 or GPU 114) may read the EDID of the second external display #2, which is currently selected by the switching circuit 51, from the switching circuit 51 or the second external display #2.

When recognizing that the second external display #2 including the higher priority than the internal LCD 31 is available, the display control circuit (CPU 111 or GPU 114) outputs the display signal again to the docker 40 through the port for the external display. Since the initialization of the internal circuit for the second external display #2 has already been completed, the switching circuit 51 may normally output the display signal received from the port for the external display to the second external display #2 through the internal circuit for the second external display #2. In the internal circuit for the second external display #2, the display signal received from the port for the external display may be converted into the display signal #2 including a format corresponding to the second external display #2. The display signal #2 is provided to the second external display #2.

By the above operations, when the first external display #1 is detached from the docker 40, the external display to be displayed may be normally switched from the first external display #1 to the second external display #2.

FIG. 6 illustrates a configuration example of the switching circuit 51.

The switching circuit 51 may include a switch module 71 and three converter ICs 72, 73 and 74. The switch module 71 functions as the above-described selection circuit. The converter IC 72 is an internal circuit corresponding to the first external display #1. The converter IC 72 may convert a display signal received through the switch module 71 into a display signal of a format corresponding to the first external display #1. The converter IC 73 is an internal circuit corresponding to the second external display #2. The converter IC 73 may convert a display signal received through the switch module 71 into a display signal of a format corresponding to the second external display #2. The converter IC 74 is an internal circuit corresponding to the third external display #3. The converter IC 74 may convert a display signal received through the switch module 71 into a display signal of a format corresponding to the third external display #3. Also, if one of the external displays connectable to the docker 40 is a display corresponding to the same standard as that of the port for the external display of the display control circuit (CPU 111 or GPU 114), a converter IC corresponding to this external display may not be necessarily provided.

A flowchart of FIG. 7 illustrates a procedure of a display control process that is performed upon docking.

A case where the first external display #1, the second external display #2, and the third external display #3 are connected to the docker 40 will be assumed herein. Also, the display priority is as follows.

first external display #1>second external display #2>internal LCD>third external display #3

When the computer 10 of the power on state is attached to the docker 40 (hot docking), or when the computer 10 attached to the docker 40 is powered on, the following operations are performed.

The I/O controller 52 determines whether or not there is change in the states of the detection signals #1, #2 and #3 (step S11). If the change in the state of any one of the detection signals #1, #2 and #3 is detected (YES in step S11), the I/O controller 52 deasserts the detection signal C (step S12), so that the connection of the external display is not notified to the display control circuit (CPU 111 or GPU 114). The I/O controller 52 transmits the detected states of the detection signals #1, #2 and #3 to the EC 130 through the I2C bus I/F (step S13).

The EC 130 checks the display priority, and then selects the first external display #1 based on the detected current states of the detection signals #1, #2 and #3 and the display priority (step S14). The switching instruction designating the first external display #1 is transmitted to the I/O controller 52 through the I2C bus I/F (step S15).

The I/O controller 52 controls the switching signal and accordingly controls the switching circuit 51 such that the first external display #1 is connected to the port for the external display of the display control circuit (CPU 111 or GPU 114) (step S16). In step S16, the I/O controller 52 also asserts the detection signal C and accordingly asserts the detection signal A. The display control circuit (CPU 111 or GPU 114) recognizes that the display connected to the port for the external display is available, and outputs the display signal through the port for the external display (step S17).

Also, if only the third external display #3 is connected to the docker 40, the screen is continuously displayed on the internal LCD 31, and thus, the screen is not displayed on the third external display #3.

Even in this case, for example, in the docker 40, the I/O controller 52 may control the switching circuit 51 such that the port for the external display is connected to the third external display #3, that is, the bus 61 and the bus 64 are connected to each other, according to the switching instruction from the EC 130. The I/O controller 52 may assert the detection signal C and accordingly assert the detection signal A. Since the detection signal A is made active, the display control circuit (CPU 111 or GPU 114) may recognize that the display connected to the port for the external display is available. In this case, since the initialization of the internal circuit for the third external display #3 has already been completed, the display control circuit (CPU 111 or GPU 114) may recognize that the third external display #3 is available, by referring to the output of the internal circuit for the third external display #3. However, since the priority of the third external display #3 is lower than the priority of the internal LCD 31, the display control circuit (CPU 111 or GPU 114) continuously displays the screen on the internal LCD 31.

Alternatively, when only the third external display #3 is connected to the docker 40, a configuration that the EC 130 does not transmit the switching instruction to the I/O controller 52 may be adopted. Even in this case, the screen can be continuously displayed on the internal LCD 31.

A flowchart of FIG. 8 illustrates a procedure of a display control process that is performed when the first external display #1 being currently used for screen display is detached from the docker 40.

When the I/O controller 52 detects a change (from "1" to "0") in the state of the detection signal #1 (YES in step S21), the I/O controller 52 deasserts (makes inactive) the detection signal C and accordingly deasserts (makes inactive) the detection signal A (step S22). The I/O controller 52 transmits the detected states of the detection signals #1, #2 and #3 to the EC 130 through the I2C bus I/F (step S23).

The EC 130 checks the display priority, and then selects the second external display #2 based on the detected current states of the detection signals #1, #2 and #3 and the display priority (step S24). The EC 130 transmits the switching instruction designating the second external display #2 to the I/O controller 52 through the I2C bus I/F (step S25).

The I/O controller 52 controls the switching signal and accordingly controls the switching circuit 51 such that the second external display #2 is connected to the port for the external display of the display control circuit (CPU 111 or GPU 114) (step S26). In step S26, the I/O controller 52 also asserts the detection signal C and accordingly asserts the detection signal A. The display control circuit (CPU 111 or GPU 114) recognizes that the display connected to the port for the external display is changed to another display, and begins to output the display signal again through the port for the external display (step S27).

FIG. 9 illustrates another configuration example of the docker 40.

In the docker 40 of FIG. 9, the docking connector 42 includes, instead of two pins corresponding to the I2C bus I/F, three pins for transmitting to the EC 130 the detection signals #1 to #3 which are respectively branched from the buses 62 to 64, one pin for receiving the switching signal from the EC 130, and one pin for receiving the detection signal C from the EC 130. By this configuration, the EC 130 may also function as the above-described I/O controller 52. Also, the configuration of the docker 40 may be simplified.

As described above, according to the present embodiment, since the docker 40 includes the switching circuit 51 and the I/O controller 52 configured to detect the detection signals #1, #2 and #3 and control the switching circuit 51, the screen may be selectively displayed on the external display connected to the docker 40 through one port of the display control circuit.

Therefore, a plurality of display connection terminals may be mounted on the docker 40, without increasing the number of ports included in the display control circuit.

Also, since the I/O controller 52 detects the states of the detection signals branched from the buses 62, 63 and 64 between the switching circuit 51 and the three display connection terminals 45, the I/O controller 52 may immediately detect whether or not each external display is connected, without waiting for the initialization completion of each internal circuit within the switching circuit 51.

Also, the information representing the display priority may be previously downloaded from the EC 130 to the I/O controller 52. In this case, the I/O controller 52 may control the switching circuit 51 based on the detected states of the detection signals #1, #2 and #3 and the display priority.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising an external device and an information processing device removably attached to the external device, the system comprising:
    first and second display connection terminals in the external device;
    a docking connector in the external device, the docking connector being electrically connected to a port of a display control circuit in the information processing device;
    a switching circuit in the external device, the switching circuit being configured to switch an external display, which is to be connected to the port of the display control circuit, between a first external display connectable to the first display connection terminal and a second external display connectable to the second display connection terminal by selecting one of the first display connection terminal and the second display connection terminal;
    a first controller in the external device, the first controller being configured to detect a state of a first detection signal representing whether or not the first external display is connected to the first display connection terminal and a state of a second detection signal representing whether or not the second external display is connected to the second display connection terminal, and to transmit the detected states of the first and second detection signals to the information processing device; and
    a second controller in the information processing device, the second controller being configured to determine an external display to be connected to the port of the display control circuit based on the detected states of the first and second detection signals and a preset display priority, and to transmit a switching instruction representing the determined external display to the first controller, wherein the first controller controls the switching circuit to connect the determined external display to the port of the display control circuit.

2. The system according claim 1, wherein
the second controller is configured to determine whether or not the first external display is connected to the first display connection terminal based on the state of the first detection signal if a priority of the first external display is higher than a priority of the second external display and a priority of an internal display of the information processing device, and to determine that the first external display is to be connected to the port of the display control circuit if the first external display is connected to the first display connection terminal, and
the first controller is configured to control the switching circuit to connect the first external display to the port of the display control circuit, and to make a first signal active after the first external display is connected to the port of the display control circuit, the first signal notifying the display control circuit that a display connected to the port is available.

3. The system according claim 2, wherein
the first controller is configured to make the first signal inactive if the first external display is detached from the first display connection terminal, and to transmit currently-detected states of the first and second detection signals to the information processing device,
the second controller is configured to determine whether or not the second external display is connected to the second display connection terminal based on the state of the second detection signal if a priority of the second external display is higher than the priority of the internal display, and to determine that the second external display is to be connected to the port of the display control circuit if the second external display is connected to the second display connection terminal, and
the first controller is configured to control the switching circuit to connect the second external display to the port of the display control circuit, and to make the first signal active after the second external display is connected to the port of the display control circuit.

4. The system according to claim 2, wherein the switching circuit comprises a first converter configured to convert a display signal output from the port of the display control circuit into a first display signal including a format corresponding to the first external display, and
the first controller is configured to make the first signal active, after the first external display is connected to the port of the display control circuit and an initialization of the first converter is completed.

5. The system according to claim 1, wherein the switching circuit comprises:
a first converter configured to convert a display signal output from the port of the display control circuit into a first display signal including a format corresponding to the first external display, and
a second converter configured to convert a display signal output from the port of the display control circuit into a second display signal including a format corresponding to the second external display.

6. The system according to claim 1, wherein the first detection signal is a first hot plug detect signal received from the first external display through the first display connection terminal, and the second detection signal is a second hot plug detect signal received from the second external display through the second display connection terminal.

7. An electronic device, to which an information processing device is removably attached, the electronic device comprising:
first and second display connection terminals;
a docking connector electrically connected to a port of a display control circuit in the information processing device;
a switching circuit configured to switch an external display, which is to be connected to the port of the display control circuit, between a first external display connectable to the first display connection terminal and a second external display connectable to the second display connection terminal by selecting one of the first display connection terminal and the second display connection terminal; and
a first controller configured to detect a state of a first detection signal representing whether or not the first external display is connected to the first display connection terminal and a state of a second detection signal representing whether or not the second external display is connected to the second display connection terminal, to transmit the detected states of the first and second detection signals to the information processing device, receive, from the information processing device, a switching instruction representing an external display to be connected to the port of the display control circuit, the external display to be connected being determined by the information processing device based on the detected states of the first and second detection finals and a preset display priority, and to control the switching circuit to connect the determined external display to the port of the display control circuit.

8. A display control method applied to an electronic device, to which an information processing device is removably attached, the electronic device comprising first and second display connection terminals, a docking connector electrically connected to a port of a display control circuit in the information processing device, and a switching circuit configured to switch an external display, which is to be connected to the port of the display control circuit, between a first external display connectable to the first display connection terminal and a second external display connectable to the second display connection terminal by selecting one of the first display connection terminal and the second display connection terminal, the display control method comprising:
detecting a state of a first detection signal representing whether or not the first external display is connected to the first display connection terminal and a state of a second detection signal representing whether or not the second external display is connected to the second display connection terminal;
transmitting the detected states of the first and second detection signals to the information processing device;
receiving, from the information processing device, a switching instruction representing an external display to be connected to the port of the display control circuit, the external display to be connected being determined by the information processing device based on the detected states of the first and second detection signals and a preset display priority; and
controlling the switching circuit to connect the determined external display to the port of the display control circuit.

* * * * *